United States Patent Office 3,377,884
Patented Apr. 16, 1968

3,377,884
GUARDING OF MACHINE TOOLS
Anthony Robin Guy, Olton, and Maurice Edward Lloyd, Birmingham, England, assignors to Wilmot Breeden Limited, Birmingham, England
Filed Nov. 18, 1965, Ser. No. 508,458
3 Claims. (Cl. 74—615)

ABSTRACT OF THE DISCLOSURE

A crank-operated press is provided with a semi-automatic guarding and controlling arrangement in which a mechanical guard mechanically interlocked with the crank of the press is provided with a power driven operator for opening and closing the guard. The guard operator is in turn controlled by a capacitive loop detector device adjacent the guard, with a control circuit such that closing of the guard is initiated on removal of the operator's hand after he has loaded a workpiece into the press. There is a switch actuated by the guard when closed which causes rotation of the crank to commence.

---

This invention relates to the guarding and controlling of machine tools of the kind in which there are power driven movable parts from which an operator is to be protected. It is one object of the invention to provide a machine tool of this kind with guarding and controlling equipment in a convenient form to render the machine tool both fast and safe to use.

In accordance with one aspect of the invention there is provided, in a machine tool of the kind specified, movable guard means mechanically interlocked with the machine tool operating mechanism and arranged so as when closed to obstruct access to a danger zone adjacent said movable parts, power operable means for opening and closing said guard means, power operable means for initiating movement of said movable parts and control means for said power operable means and including a detection device capable of sensing the presence of an operator's hand or other obstruction in the danger zone and a device sensitive to the closing of the guard means and arranged so that, in use, when an obstruction is inserted into the danger zone and then removed closing of the guard means is initiated and the movable parts are automatically set in motion when the guard reaches its closed position.

The invention also resides in a guard arrangement for a machine tool of the kind specified and in accordance with this respect of the invention there is provided movable guard means adapted to be mounted on the machine tool to obstruct access to a danger-zone adjacent said movable parts, mechanical interlock means coupled to said guard means and adapted to co-act with the machine tool operating mechanism to prevent opening of the guard means when the movable parts are in motion and to prevent the movable parts from being set in motion whilst the guard means are open to permit access to the danger zone, power operable means for opening and closing the guard means, and control means including a detector device adapted to sense the presence of an obstruction in the danger zone, the control means being arranged to initiate closing of the guard means when a previously inserted obstruction is removed from the danger zone and to initiate movement of the movable parts when the guard means closes.

Figure 1:
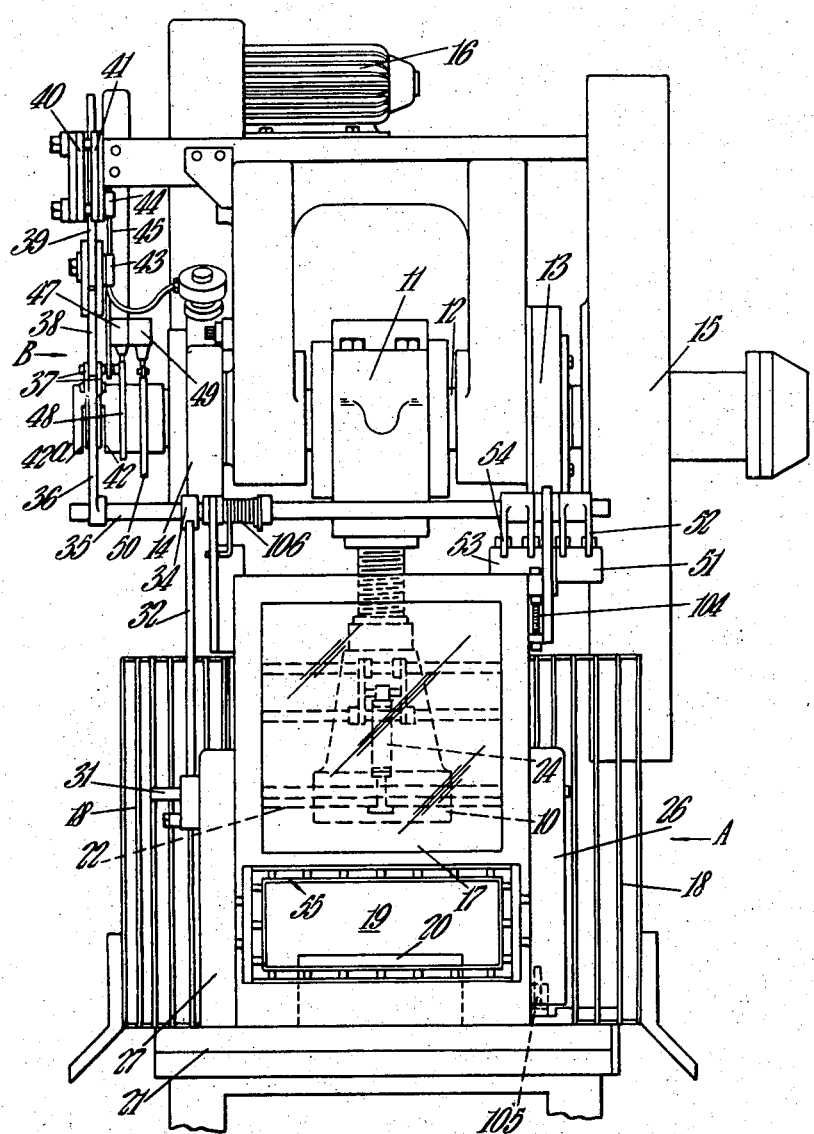
Figure 2:
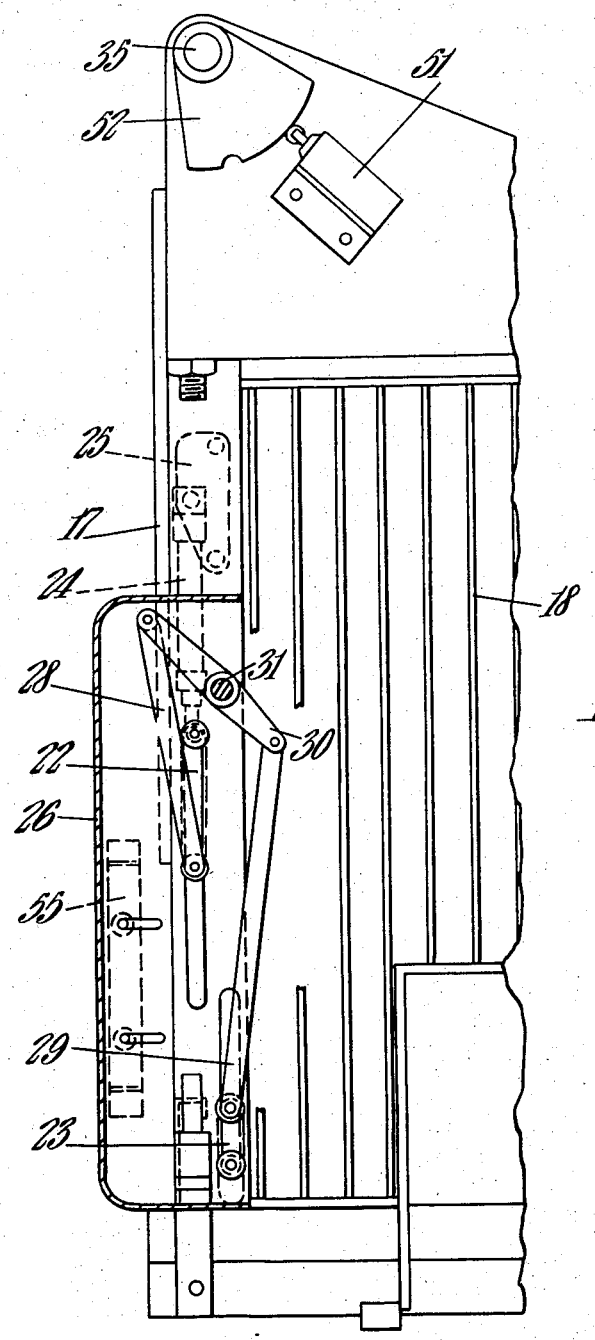
Figure 3:
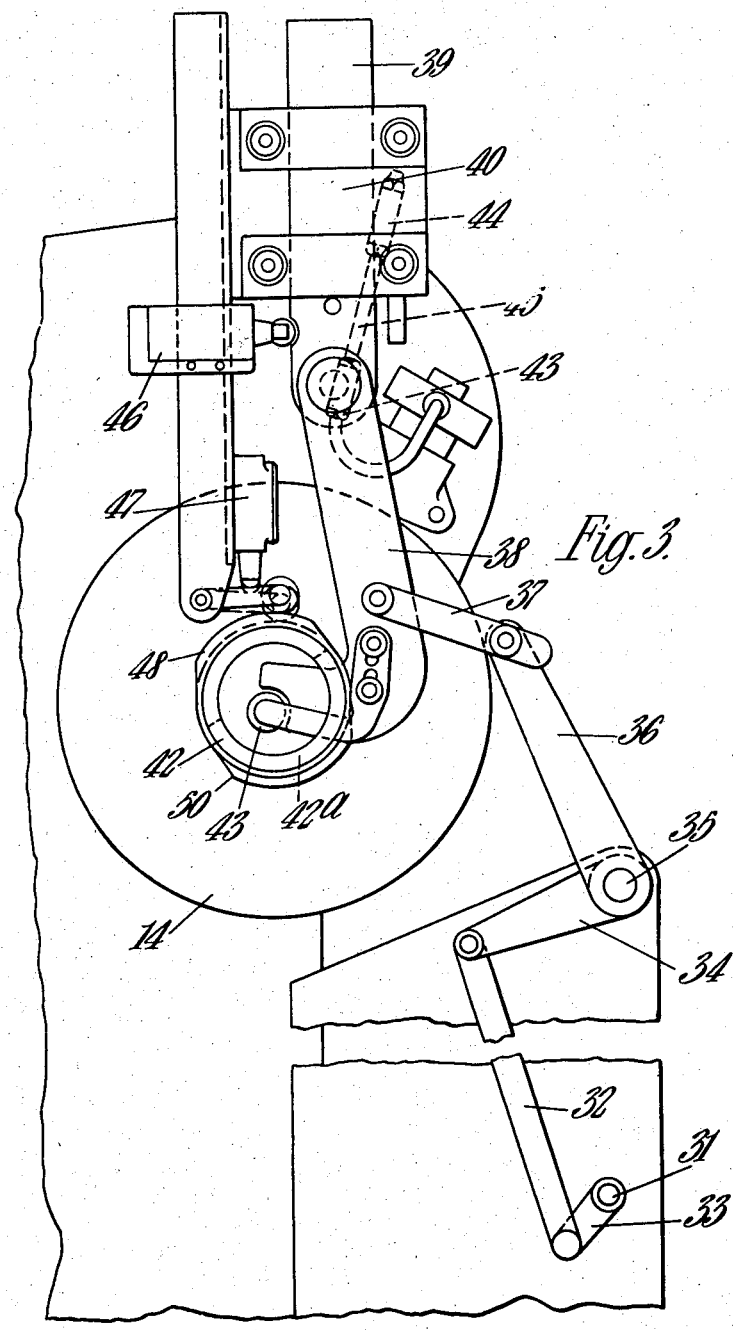
Figure 4:
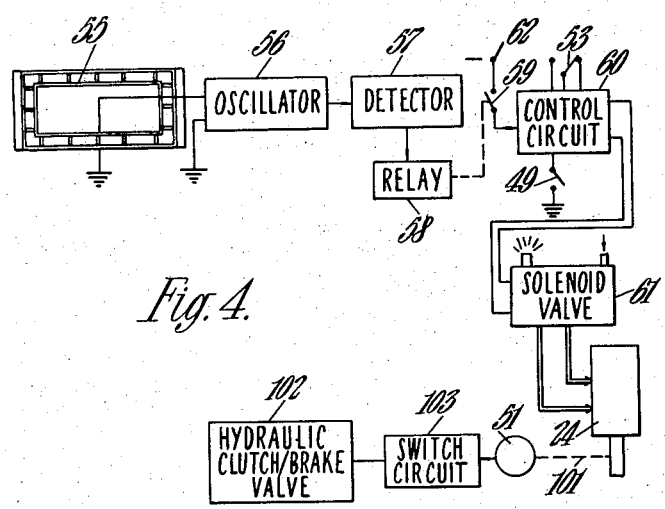
Figure 5:
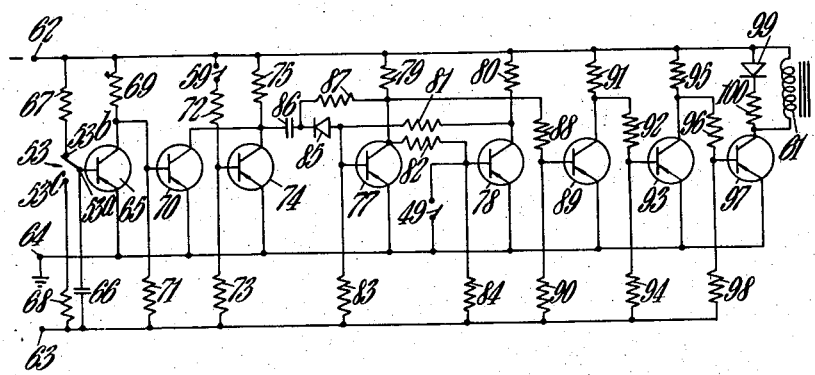

Reference will now be made to the accompanying drawings in which:

FIGURE 1 is a front view of a press to which an example of the invention is applied;
FIGURE 2 is an enlarged fragmentary view on arrow "A" in FIGURE 1 with parts broken away or removed for clarity;
FIGURE 3 is an enlarged fragmentary view on arrow "B" in FIGURE 1;
FIGURE 4 is a diagram showing the electrical circuit arrangements employed in the example described, and
FIGURE 5 is a circuit diagram showing details of part of the arrangement shown in FIGURE 4.

Referring to the drawings it will be seen that the press is of the type in which the ram 10 is reciprocable by an arrangement of eccentrics 11 on a crankshaft 12. The crankshaft is provided with a clutch 13 and a brake 14 both of which are hydraulically powered and are arranged so that supplying pressure to both causes the clutch to engage and the brake to disengage. On release of the pressure the clutch is disengaged and the brake is engaged.

The input member of the clutch 13 is driven by a flywheel contained within a casing 15 and driven in the usual way through reduction gearing by a motor 16.

Guarding of the press is effected by the combination of a glazed front guard 17 (carried on vertical hinges 104, 105) and fixed wire mesh side guards 18. An opening 19 in the front guard is disposed to allow access to the die or bottom tool 20 carried on the table 21 of the press.

A movable guard constituted by a pair of vertically slidable gates 22, 23 is provided for closing the opening 19, power operated means in the form of a double acting pneumatic piston and cylinder unit 24 being arranged to operate the upper gate 22. As shown the cylinder of unit 24 is pivoted on brackets 25 on the front guard 17 and the piston rod is pivoted to the upper gate 22. The gates 22, 23 are interconnected by a pair of linkages carried respectively in housings 26, 27 on opposite sides of the front guard. Each linkage comprises first and second links 28, 29 pivoted respectively to the gates 22, 23 and both are connected to a lever 30 secured to a spindle 31 extending across the front guard 17. It will thus be seen that lowering of the upper gate 22 will cause, through the intermediary of link 28, spindle 31 to be turned in an anti-clockwise direction (as viewed in FIGURE 2) so that the lower gate 23 is raised by links 29.

The gates 22, 23 are coupled to the control system of the press by means of a link 32 pivoted to an arm 33 secured to one end of the spindle 31. This link 32 is pivoted at its opposite end to an arm 34 secured to a cam shaft 35 extending across the top of the front guard. (It is to be noted here that the front guard cannot be opened on its hinges 104, 105 without first removing link 32. A spring 106 on cam shaft 35 then holds this shaft in the position it occupies when the gates 22, 23 are closed.) A further arm 36 is secured to the camshaft 35 and a pair of links 37 couple this arm 36 to a hook member 38 swingable on a slide member 39. Slide member 39 is clamped between plates 40 and 41 on a structure at the top of the press.

As shown the crankshaft 12 of the press has a hollow extension 42 in which a slot 42a is formed to receive the lower end of the hook member 38. The hook member carries a roller 43 to engage the exterior of the extension 42 as this rotates in use. Attached to the slide member 39 and to the plate 41 are a pair of hydraulic connectors 43, 44 between which extends a short length of piping 45. Connector 43 is connected into the hydraulic system whilst connector 44 is normally closed off. Slide member 39 is also formed with a notch in which the follower of a switch 46 in the circuit of motor 16 normally rests.

The arrangement of the various arms and linkages is such that when the gates 22, 23 are open the hook member 38 occupies the position shown with the end of the hook member projecting into the slot 42a. On movement of the gates to their closed positions, however, hook member 38 is swung clear of the extension 42. If, by some mischance, the crankshaft tends to move out of its top dead centre position whilst the gates are open, the hook member 38 will be engaged by the end of the slot 42 and the slide member 40 will slip downwardly. This will cause the switch 46 to be operated and the motor 16 will be stopped. Moreover the piping 45 will be pulled from one of the connectors and the hydraulic system will be de-pressurised. This, in turn, will cause the clutch 13 to be disengaged and the brake 14 to be engaged.

The clutch 13 and brake 14 are normally under the control of a solenoid operated hydraulic valve 102 and a switch 47 is provided to co-act with a cam 48 on the crankshaft extension 42 to open this valve at top dead centre through the usual switch circuit arrangements 103 so that the press can be operated in one-stroke cycles. A further switch 49 is also provided operable by a second cam 50 on the extension 42. This cam 50 closes switch 49 at bottom dead centre and its purpose will be made clear hereinafter.

The hydraulic clutch/brake valve is also under the control of a switch 51 operable by a cam 52 on the camshaft 35. This switch 51 is only closed when the gates 22, 23 are closed. A further switch 53 is operable by the camshaft 35, through a cam 54. This switch is a two-way switch which is only operated when the gates are open.

There is also provided a detector device in the form of a capacity loop 55 which is adjustably mounted between the housings 26, 27. This loop 55, the construction of which is known per se is arranged so that the operator's hand must pass through it to reach the die or bottom tool 20. This has the effect of changing the capacitance of the loop 55.

The loop is connected in an oscillator circuit 56 which is tuned to oscillate when the gates 22, 23 are open and there is no obstruction near the loop 55. When the capacitance of the loop 55 is changed by the presence of an obstruction the oscillator is thrown off tune and, as a result current flows from a detector 57 to a relay 58. Relay 58 has contacts 59 in a control circuit 60 in which switches 49 and 53 are also connected and the output of the control circuit is used to power a solenoid-operated pneumatic valve 61 controlling the supply of air to the piston and cylinder unit 24. When the valve 61 is energised the valve connects the top end of the cylinder 24 to the air supply and exhausts the bottom end so as to cause the gates 22, 23 to close. On de-energisation the air connections are reversed to tend to cause the gates to open. (NOTE: The dotted line 101 in FIGURE 10 shown connecting unit 24 to switch 51 is merely intended to show diagrammatically that switch 51 is operated as a consequence of the operation of unit 24 and does not indicate any electrical interconnection.)

The control circuit 60 is shown in more detail in FIGURE 5. As shown, there are provided three terminals 62, 63 and 64 connected respectively to the negative and positive sides of a D.C. supply and to earth. The two-way switch 53 has its common pole 53a connected to the base of a p-n-p transistor 65 and also, through a capacitor 66 to the terminal 63. The pole 53b which is connected to the pole 53a only when the gates 22, 23 are open, is connected via a resistor 67 to the terminal 62. The other pole 53c is connected via a resistor 68 to the terminal 63. The emitter of transistor 65 is connected to terminal 64 and its collector is connected via a resistor 69 to the terminal 62. This circuit acts as a delay device so that there is a short delay between the time when the switch 53 is operated as the gates 22, 23 reach their open positions and the time when the transistor 65 becomes conductive (having previously been non-conductive as a result of having its base connected to the terminal 63).

The collector of the transistor 65 is connected to the base of a p-n-p transistor 70 which is also connected via a resistor 71 to the terminal 63. The emitter of transistor 70 is connected to terminal 64. The contacts 59 of the relay 58 are connected in a series circuit comprising two resistors 72 and 73 bridging the terminals 62, 63, the contacts 59 being interposed between the resistor 72 and the terminal 62. The base of a p-n-p transistor 74 is connected to the common point of the resistors 72, 73 and its emitter is connected to the terminal 64. The collectors of transistors 70 and 74 are connected together and through a resistor 75 to the terminal 62. This circuit is an AND gate such that the interconnection 76 of the resistor 75 and the collectors of the two transistors 70, 74 is at substantially earth potential except when the transistor 65 is conductive and contacts 59 are open simultaneously.

The next stage consists of a bi-stable circuit comprising a pair of p-n-p transistors 77, 78 the emitters of which are connected to terminal 64 and the collectors of which are connected to terminal 62 through resistors 79 and 80 respectively. The base of transistor 77 is connected via a resistor 82 to the collector of the transistor 78, the base of which is connected to the collector of the transistor 77 via a resistor 82. The bases of the transistors 77, 78 are connected via resistors 83, 84 respectively to terminal 63. The switch 49 connects the base of the transistor 78 to the terminal 64 so that this transistor cannot conduct when the switch 49 is closed.

The bi-stable circuit is connected to the output terminal 76 of the AND gate by a diode 85 with its anode connected to the base of the transistor 77 and its cathode connected via a capacitor 86 to terminal 76 and via a resistor 87 to the collector of the transistor 77. This coupling circuit serves to differentiate the output of AND gate and causes a pulse to be produced during discharge of the capacitor 86 after successive opening and closing actions of the contacts 59. This pulse will serve to switch the bi-stable circuit from a state in which the transistor 77 is conducting and the transistor 78 is not conducting to the state in which the transistor 78 is conducting and the transistor 79 is not conducting. The circuit is removed from this state by a subsequent closing of switch 49.

The output of the bi-stable circuit is taken from the collector of the transistor 77 and it will be seen that this is at a negative potential when the circuit is in its initial state and at substantially earth potential when the circuit has changed state. A resistor 88 connects the collector of the transistor 77 to the base of the first p-n-p transistor 89 in an amplifier circuit, this base being also connected via a resistor 90 to the terminal 63. The collector of the transistor 89 is connected via resistors 91 and 92 respectively to terminal 62 and the base of a second p-n-p transistor 93 of the amplifier. The emitter of transistor 93 is connected to the terminal 64 and its base and collector are connected via resistor 94 and 95 respectively to terminals 63 and 62. The collector of transistor 93 is also connected via a resistor 96 to the base of a final p-n-p transistor 97 of the amplifier. This base is also connected through a resistor 98 to the terminal 63 and the emitter of the transistor is connected to terminal 64. The collector of transistor 97 is connected to one end of the winding of the solenoid valve 61, the other end being connected to the terminal 62. The winding 61 is bridged by a series circuit consisting of a diode 99 wth ts anode connected to the terminal 62 and a resistor 100 connecting the cathode of the diode 99 to the collector of the transistor 97. The diode 99 serves to prevent the back E.M.F. generated in winding 61 on de-energisation thereof from damaging the transistor 97.

In use a cycle may be considered to commence with the crankshaft 12 in its dead centre position and with the gates 22, 23 open. The time delay having elapsed since operation of the switch 53, the transistor 65 becomes conductive, so rendering the transistor 70 non-conductive. At this stage in the cycle the contacts 59 are closed until the operator inserts his hand through the loop 55 and opening 19 to load a new workpiece into the press. This causes contacts 59 to open and transistor 74 to become non-conducting. This change does not have any effect on the bi-stable circuit, but when the operator's hand is withdrawn again the bi-stable circuit changes state and an amplified signal is supplied to the solenoid valve 61. As a result air is passed to the unit 24 to close the gates 22, 23. As soon as these gates move out of their fully closed positions the switch 53 is operated so that the transistor 65 has its base connected via resistor 68 to the positive terminal 63 and becomes non-conductive. Until switch 53 is operated again at the end of the cycle, therefore, transistor 70 will be conductive so that opening and closing of the contacts 59 will be ineffective to exert any controlling influence on the working of the press. The bi-stable circuit continues to cause a signal to be supplied to the solenoid winding 61 until later in the cycle.

When the gates 22, 23 are fully closed the switch 51 is operated and the valve 102 is therefore actuated. This causes the clutch 13 to be engaged and the brake 14 to be released with the result that the crankshaft 12 is driven and the ram 11 commences its stroke. At bottom dead centre the switch 49 is closed briefly to reset the bi-stable circuit. As a result the solenoid valve 51 is de-energised and the air connections to the unit 24 are reversed. The gates 22, 23 cannot start to open, however, until the slot 42a in the crankshaft extension 42 is aligned with the end of the swingable hook member 38. As soon as such alignment occurs the gates 22, 23 open and the crankshaft 12 comes to rest at its top dead centre position. After the necessary time delay (to ensure that the detector device is not made effective until the gates and ram have stopped moving) the cycle can re-start after the insertion of a new workpiece.

The finished workpiece can be ejected in any convenient fashion either rearwardly or sideways, but this does not form part of the present invention. The invention provides, however, a convenient mid-way stage between the more usual type of hand-fed pedal-operated presses in which the guard may be closed either manually or mechanically from the press crankshaft and the more sophisticated and highly expensive fully automatic press lines. The press will operate at a very high speed compared with the former type of press, since the operator has but one operation to perform—i.e., he has only to lift a workpiece from a suitably placed store, insert into the bottom tool when the gates open and withdraw his hand. Time and effort are not wasted by opening and closing of guards or pressing of pedals. As a result production will not only be increased, but the operator will find the work less tiring.

The above described example of the invention includes a detector device of the capacity loop type. Other types of detector could, of course, be employed. One example of this is a detector arrangement using light beams and one or more photoelectric cells. In such an arrangement the circuit whereby control is removed from the detector device whilst the gates are closed could be omitted since the device would not be sensitive to movement of the gates or the ram.

It is to be noted that whilst the operator is loading the press, he is fully protected by a mechanical interlock between the guard means and the operating gear of the press and not merely by an electronic or electrical interlock. Thus there is provided a high speed manually fed press which provides complete protection for the operator in a relatively simple and inexpensive manner.

Having thus described our invention what we claim as new and desire to secure by Letters Patent is:

1. A machine tool having a movable part, an operating mechanism for moving said movable part, a mechanical guard for obstructing access to a danger zone around said movable part, mechanical interlock means between the guard and the operating mechanism preventing operation of the movable part when the guard is in an open condition to allow access to the movable part, and preventing opening of the guard during operation of said movable part, power operable means for opening and closing the guard, and a control arrangement for automatically controlling said power operable means and said operating mechanism and comprising a detector device mounted adjacent said danger zone and adapted to detect the presence of an obstruction such as an operator's hand in the danger zone, a relay switch connected to the detector device for actuation of the relay, an electrical circuit controlled by said relay switch and producing an output on de-actuation of said relay switch following actuation thereof, said power operable means being operatively connected to said electrical circuit for operation of said power operable means to close the guard on de-actuation of said relay switch, and switch means on the machine tool actuable by a movable member coupled to the guard on closing of the guard and connected to initiate operation of said operating mechanism so that in use an automatic programme consisting of the closing of the guard and the subsequent actuation of the operating means is initiated on removal of an operator's hand from the danger zone after the loading of a workpiece into the danger zone.

2. A machine tool as claimed in claim 1 in which there is provided further switch means actuable by a movable member coupled to the guard when the guard is closed connected to prevent said relay switch from affecting the operation of said power operable means until the guard means is re-opened.

3. A machine tool as claimed in claim 2 in which the detector device comprises a capacity loop mounted so that an operator's hand must pass through the loop to gain access to the danger zone and in which there is provided an oscillator of which said loop is an active circuit element and which is turned to oscillate only in the absence of any obstruction in the loop, and a detector connected to said oscillator to detect the cessation of oscillation and connected to said relay switch for the actuation thereof on cessation of oscillation.

References Cited
UNITED STATES PATENTS

| | | | |
|---|---|---|---|
| 2,683,515 | 7/1954 | Horn et al. | 74—615 X |
| 2,725,287 | 11/1955 | Knoth | 74—615 X |
| 2,929,969 | 3/1960 | Denysiuk | 340—258 X |
| 3,301,269 | 1/1967 | Marwood | 137—30 |

FRED C. MATTERN, Jr., *Primary Examiner.*

W. S. RATLIFF, *Assistant Examiner.*